(12) United States Patent
Mondry et al.

(10) Patent No.: US 7,025,682 B2
(45) Date of Patent: Apr. 11, 2006

(54) DOUBLE-JOINTED CARDAN SHAFT

(75) Inventors: Siegfried Mondry, Bietigheim-Bissingen (DE); Frank Schweizer, Sachsenheim (DE)

(73) Assignee: Elbe & Sohn GmbH & Co., Bietigheim-Bissingen (DE)

( * ) Notice: Subject to any disclaimer, the term of this patent is extended or adjusted under 35 U.S.C. 154(b) by 196 days.

(21) Appl. No.: 10/655,287

(22) Filed: Sep. 4, 2003

(65) Prior Publication Data

US 2004/0072621 A1  Apr. 15, 2004

(30) Foreign Application Priority Data

Sep. 5, 2002  (EP) .................................. 02019968

(51) Int. Cl.
*F16D 3/33* (2006.01)

(52) U.S. Cl. ........................... 464/118; 464/905; 464/11

(58) Field of Classification Search ................ 464/118, 464/905, 11; 403/126, 124
See application file for complete search history.

(56) References Cited

U.S. PATENT DOCUMENTS

| 1,774,679 A | | 9/1930 | Swenson |
| 2,042,513 A | * | 6/1936 | Daniell ........................ 464/118 |
| 2,067,286 A | * | 1/1937 | Pearce ........................ 464/118 |
| 2,855,232 A | | 10/1958 | Kozak |
| 2,953,910 A | | 9/1960 | Hustader |
| 2,988,904 A | | 6/1961 | Mazziotti |
| 3,120,746 A | * | 2/1964 | Kayser ........................ 464/7 |
| 4,207,757 A | * | 6/1980 | Onuma ........................ 464/11 |
| 4,276,759 A | | 7/1981 | Faulbecker |
| 6,042,293 A | | 3/2000 | Maughan |

FOREIGN PATENT DOCUMENTS

DE  19818570  10/1998

\* cited by examiner

*Primary Examiner*—Kenneth Thompson
(74) *Attorney, Agent, or Firm*—Davidson, Davidson & Kappel, LLC

(57) ABSTRACT

A double-jointed cardan shaft for vehicles includes a first yoke journal assembly disposed in a first fork joint, the first fork joint including a ball calotte, a second yoke journal assembly disposed in a second fork joint, and a connection element connecting the first and second fork joints. A centering ball is disposed in the ball calotte and has a bore. A first cavity is formed between the centering ball and the ball calotte. An elastic gasket disposed outside of the ball calotte forms a second cavity between the elastic gasket and the ball calotte. A centering pin is connected to the second fork joint and disposed in the bore, and a plurality of lubricant recesses for a lubricant are disposed at an interface between the centering pin and the bore. The centering ball includes at least one indentation extending along an outer circumferential surface of the centering ball such that no lubricant may pass from the first cavity to the second cavity.

19 Claims, 5 Drawing Sheets

DOUBLE-JOINTED CARDAN SHAFT

Priority is claimed to European Patent Application EP 02019968.3, filed on Sep. 5, 2002, the entire disclosure of which is incorporated by reference herein.

BACKGROUND

The present invention relates to a double-jointed cardan shaft for vehicles.

Double-jointed cardan shafts are generally known that have a first and a second yoke journal assembly that are operatively connected to each other by means of a first and second fork joint, whereby the two fork joints are connected by means of a connection element and a ball calotte. Such connection techniques used to be very problematic in the past. With the prior-art double-jointed cardan shafts, very severe wear and tear occurred, particularly in the area of the centering means, which then caused the shaft to break.

SUMMARY OF THE INVENTION

An object of the present invention is to provide a cardan shaft having improved tribological properties.

The present invention provides a double-jointed cardan shaft for vehicles, having the following features:
 a) the double-jointed cardan shaft has a first and a second yoke journal assembly (17, 18),
 b) the yoke journal assemblies (17, 18) are accommodated in a first and a second fork joint (19, 20),
 c) the two fork joints (19, 20) are in drive-connection by means of a connection element (15),
 d) the first fork joint (19) has a ball calotte (4) that serves to accommodate a centering ball (3),
 e) the centering ball (3) is accommodated in the calotte (4) provided on the fork joint (19),
 f) the joint ball or centering ball (3) has one or more indentations (9.1) on its outer circumference that extend along the surface (6) of the joint ball (3) in such a way that no lubricant can get from the first cavity (8.1) into the second cavity (8), which is at least sealed to the outside by an elastic gasket (10),
 g) the centering ball (3) accommodated in the calotte (4) is provided with a bore (14) to accommodate a centering pin (1),
 h) which is firmly connected to the second fork joint (20),
 i) the bore (14) of the centering ball (3) and/or of the centering pin (1) and/or of a sliding bearing bush (2) provided on the centering pin has one or more indentations (7) for a lubricant.

The present invention thus provides a double-jointed cardan shaft having improved durability and the lubrication properties between the moving parts are such that, even with long running times and high speeds, only slight abrasion occurs.

For this purpose, the indentations in the surface of the joint ball or centering ball may advantageously extend on one half of the surface of the joint ball or centering ball all the way to the front surface at one end and all the way to the middle area of the surface of the joint ball at the other end.

Numerous indentations may advantageously run approximately parallel to each other and be arranged at about the same distance on the surface of the joint ball or centering ball and the indentations on the surface of the joint ball or centering ball may cover an angle range a of approximately 20° to 30°.

Moreover, it is advantageous for the indentations of the surface of the joint ball or centering ball and the indentation in the sliding bearing bush to be supplied with lubricant via at least one supply opening. Advantageously, for this purpose, the sliding bearing bush may have numerous openings or indentations or grease chambers arranged at a distance from each other.

Through the use of a sliding bearing bush with numerous openings or grease chambers arranged at a distance from each other, the lubricant can be effectively introduced between the two moving parts in a simple manner, thus ensuring the sliding capability over a long operating life.

An additional possibility according to an embodiment is for there to be one or more indentations on the inner surface of the calotte and/or in the bore of the centering ball and/or on the outer surface of the centering ball. The indentations provided in various places constitute a further improvement of the device according to the present invention and likewise guarantee good lubrication of all of the parts that rotate or move with respect to each other.

Furthermore, it is advantageous for the sliding bearing bush to be made of a softer material than the centering ball. This likewise achieves an improvement in the operating life of the double-jointed cardan shaft.

It is also advantageous for the sliding bearing bush to be made of plastic, steel or bronze.

According to a preferred embodiment of the inventive solution, it is provided that the centering pin is inductively hardened and tempered after the hardening procedure.

The surface of the centering ball may be surface-coated and Teflon material may be incorporated into the surface.

In conjunction with the configuration and arrangement according to the present invention, it is advantageous for a metal layer to be applied onto the surface or outer surface of the centering pin under a plasma at pressures below $5 \times 10^{-1}$ mbar.

It is also advantageous for the first layer or pre-layer to be applied by means of the PVCD process, the second layer by means of the sputtering process and the third layer by means of the PVCD process, wherein the first pre-layer provided between the surface of the centering pin and the second layer or metal layer has a thickness that is less than 200 Å.

According to another embodiment, it is advantageous for the centering ball to be non-rotatably connected to the bush and/or to the centering pin.

Moreover, it is advantageous for the cross section of the centering pin and for the inner diameter of the bore of the bush and/or of the bore of the centering ball to be eccentric.

In another embodiment of the present invention, it is advantageous for the clearance fit between the calotte and the ball to be equal to or smaller than the clearance fit between the bore of the ball and the outer diameter of the centering pin, and for the cavity or interior space of the calotte to be sealed by a bellows.

It is advantageous for the metal layer on the pin to be a Ni layer with a greater hardness than the metal layer or the Ni layer on the ball surface, whereby Teflon is also incorporated into the latter.

BRIEF DESCRIPTION OF THE DRAWINGS

Additional advantages and details of the present invention are included in the claims and in the description with reference to the drawings, in which:

DETAILED DESCRIPTION

Figure 1:
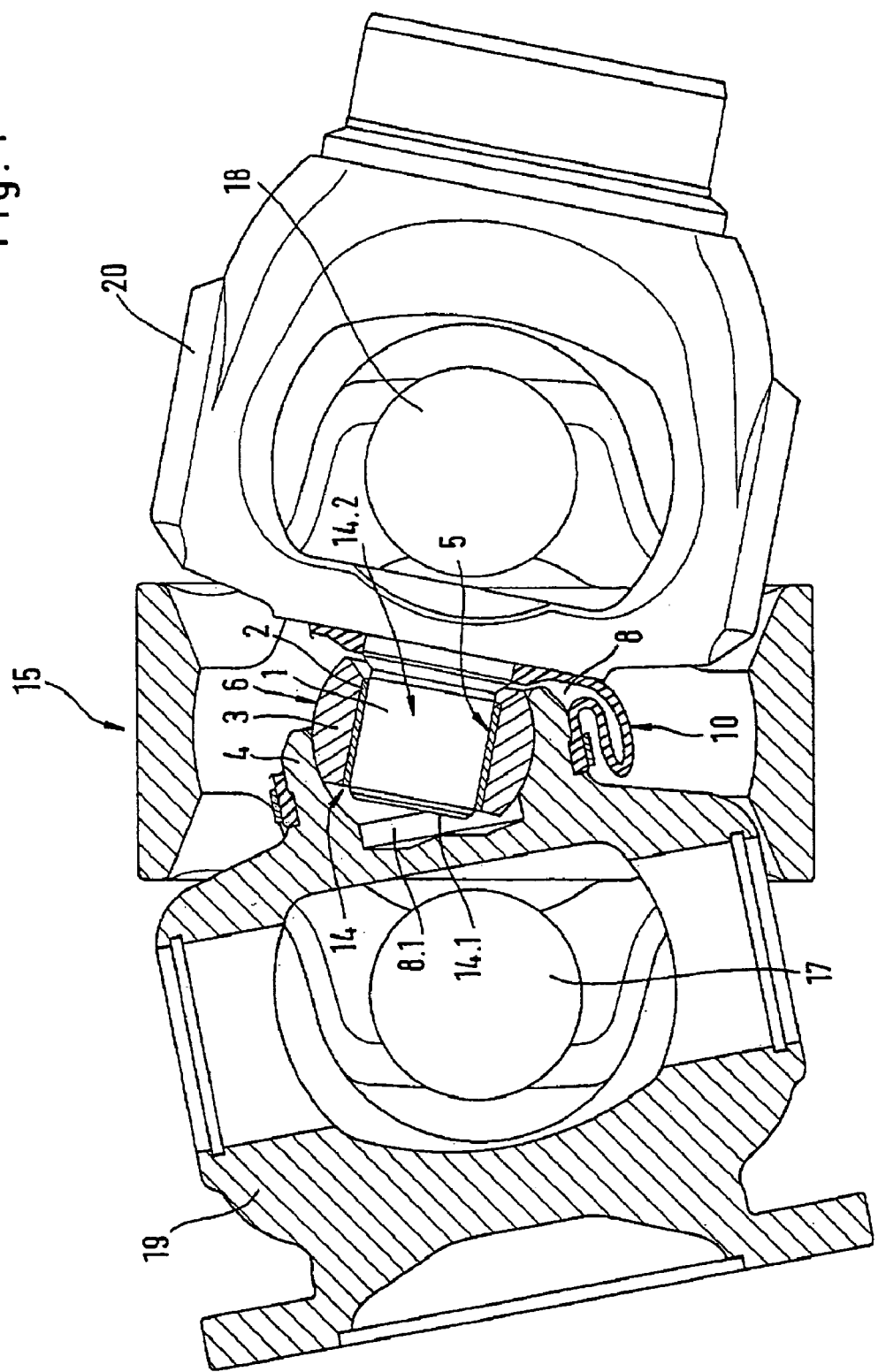
FIG. 1 shows a sectional view of the double-jointed cardan shaft with a centering pin accommodated in a centering ball and a bush.
Figure 1B:
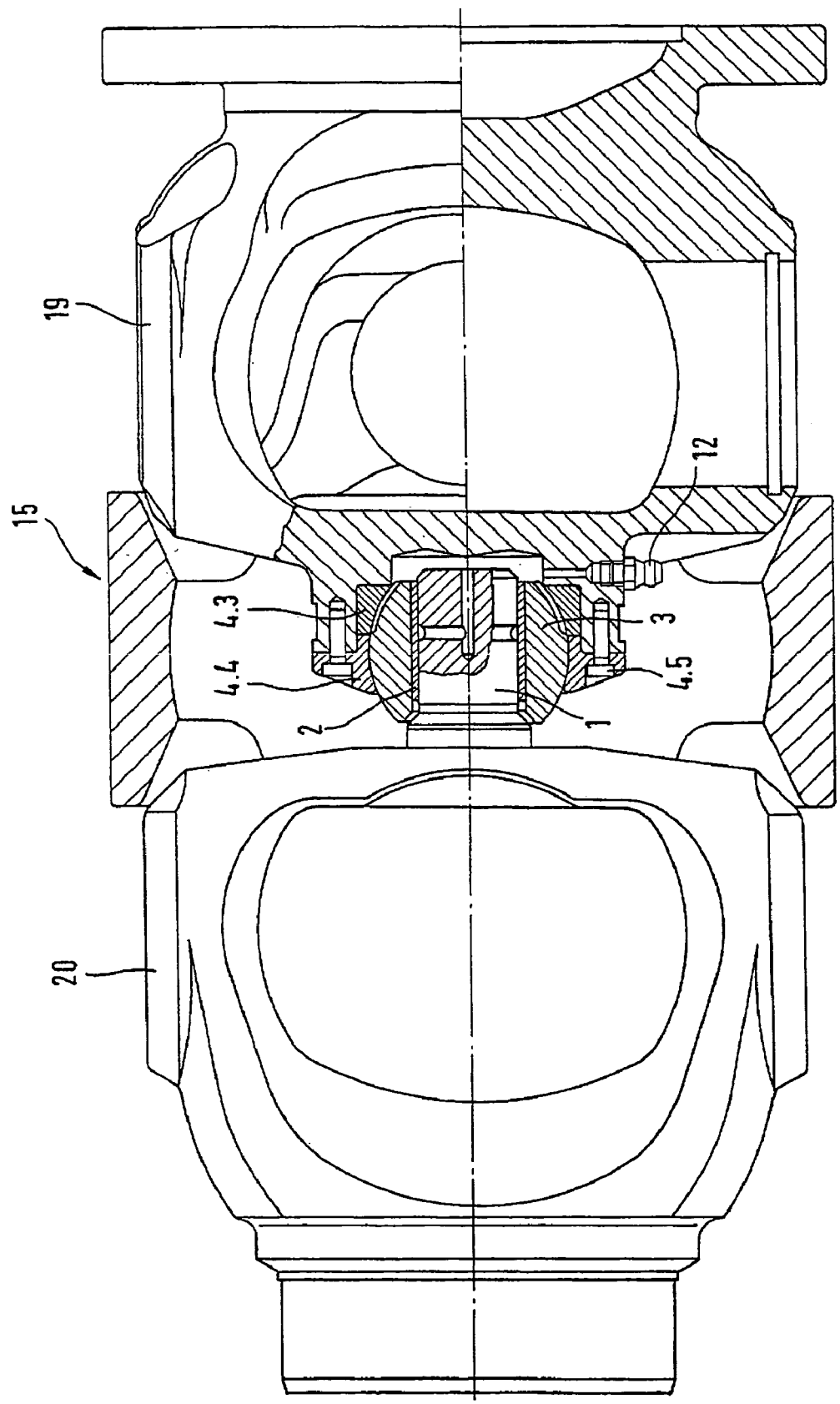
FIGS. 1b and 1c show a sectional view of another embodiment of a double-jointed cardan shaft with a centering pin accommodated in a centering ball and a bush.

FIG. 1 shows a schematic view of a double-jointed cardan shaft for vehicles that has a first and second yoke journal assembly 17 and 18. The yoke journal assembly 17 shown on the left-hand side in FIG. 1 has a calotte 4 or ball calotte that is an integral part of a fork joint 19 and that serves to accommodate a centering ball 3 which, in turn, is provided with a bore 14 to accommodate a centering pin 1. The centering pin 1 has a centering front surface 14.1 that, with an interior space or cavity 8, forms a closed chamber that is sealed to the outside by means of a bellows 10.

The centering pin 1 is, in turn, firmly arranged on a fork joint 20. On the centering pin 1, there is a sliding bearing bush 2 made, for example, of bronze, which can be accurately fitted into the centering ball 3. The bush 2 has a bore or a cylindrical inner bearing surface 14.2.

Figure 2:
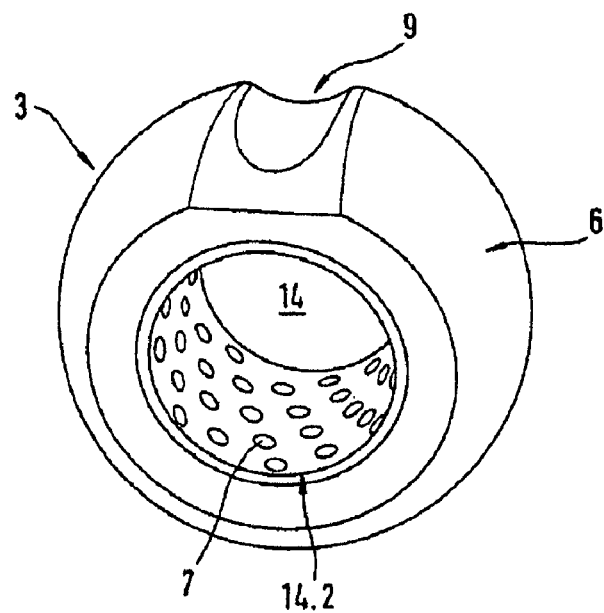
FIG. 2 shows a perspective depiction of the centering ball.

The sliding bearing bush 2 has numerous openings or passages or chambers or grease chambers 7 into which lubricant can be inserted. According to FIG. 2, the grease chambers 7 are configured with a circular shape. However, they can also be configured with an elliptical or rectangular shape, whereby the distance between the individual grease chambers 7 that are evenly distributed along the inner circumference of the sliding bearing bush 2 can also differ.

Instead of the sliding bearing bush 2 with the numerous grease chambers 7, they can also be only placed in the inner surface of the bore 14.2 of the sliding bearing bush 2. By the same token, these grease chambers 7 can be provided on the outer surface of the centering pin 1.

The surface of the centering pin 1 can be made of a chromium-nickel alloy and can have a substantially greater hardness than the sliding bearing bush 2 which, in the embodiment, can be made of bronze or else of another material having a lower hardness. For example, the sliding bearing bush can also be made of a plastic material.

The centering ball 3 has a centering ball outer surface 6 that is likewise surface-coated or can be coated, whereby the layer material can likewise consist of a chromium-nickel alloy. For example, it is possible for the metal layer that is applied onto the centering pin surface 5 and/or on the centering ball surface 6 to be applied under a plasma at pressures below $5 \times 10^{-1}$ mbar.

The centering ball surface 6, especially the centering pin surface 5, can also consist of a layer structure in order to achieve extremely high hardness values with very good conduction properties. For this purpose, for example, the first layer or the pre-layer, which is applied onto the centering pin 1, can be applied by means of the PVCD process, the second layer by means of the sputtering process and the third layer by means of the PVCD process, whereby the first pre-layer provided between the surface 5 of the centering pin 1 and the second layer or metal layer has a layer thickness that is less than 200 Å.

Figure 3:
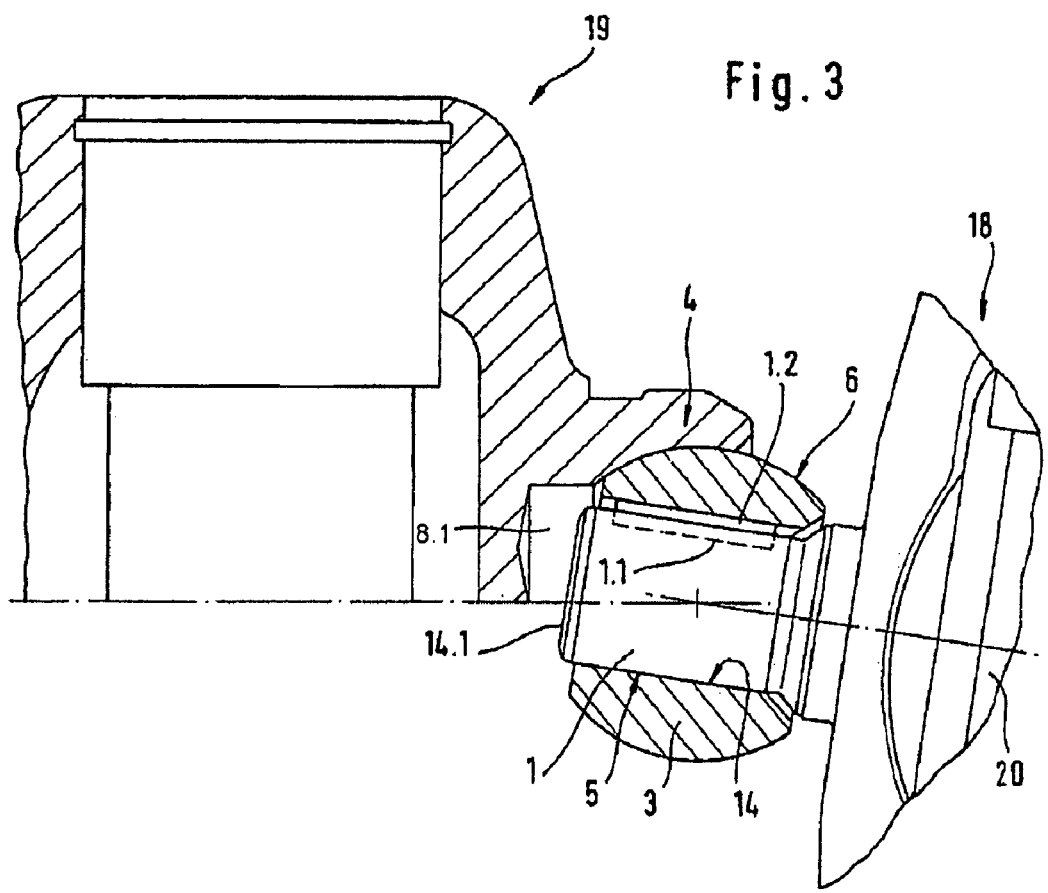
FIG. 3 shows another embodiment of a double-jointed cardan shaft with a centering ball which is non-rotatably connected to the journal.

In the embodiment according to FIG. 3, for example, the sliding bearing bush 2 is absent. In order to avoid abrasion between the bore 14 of the ball 4 and the centering ball outer surface 6, for example, instead of a circular cross section for the centering pin 1 or for the bore 14, another cross section can also be selected so that there can be no rotational movement of the centering pin 1 in the bore 14 of the centering ball 3. In other words, a non-rotatable connection is thus obtained between the centering pin 1 and the centering ball 3. For this purpose, in the embodiment according to FIG. 3, the centering pin 1 has a groove 1.1 to accommodate a spring 1.2. As already mentioned, the sliding bearing bush 2 according to FIG. 1 can be dispensed with according to another embodiment. For this purpose, the bore 14 of the centering ball or the joint ball 3 is reduced in size and the inner surface of the joint ball is likewise coated. Instead of the grease chambers 7 provided in the sliding bearing bush 2, for example, the centering pin surface 5 has one or more lubricating channels that, when the centering pin executes an axial movement, ensure a very good permanent lubrication between the bore 14 of the centering ball 3 and the centering pin outer surface 5.

For example, as a result of the lubrication, lubricant goes into the centering or joint ball 3 and also into the sliding bearing bush 2 having grease chambers 7. By the same token, the lubricant also goes between the various surfaces of the centering ball outer surface 6 and the calotte 4.

Figure 4:
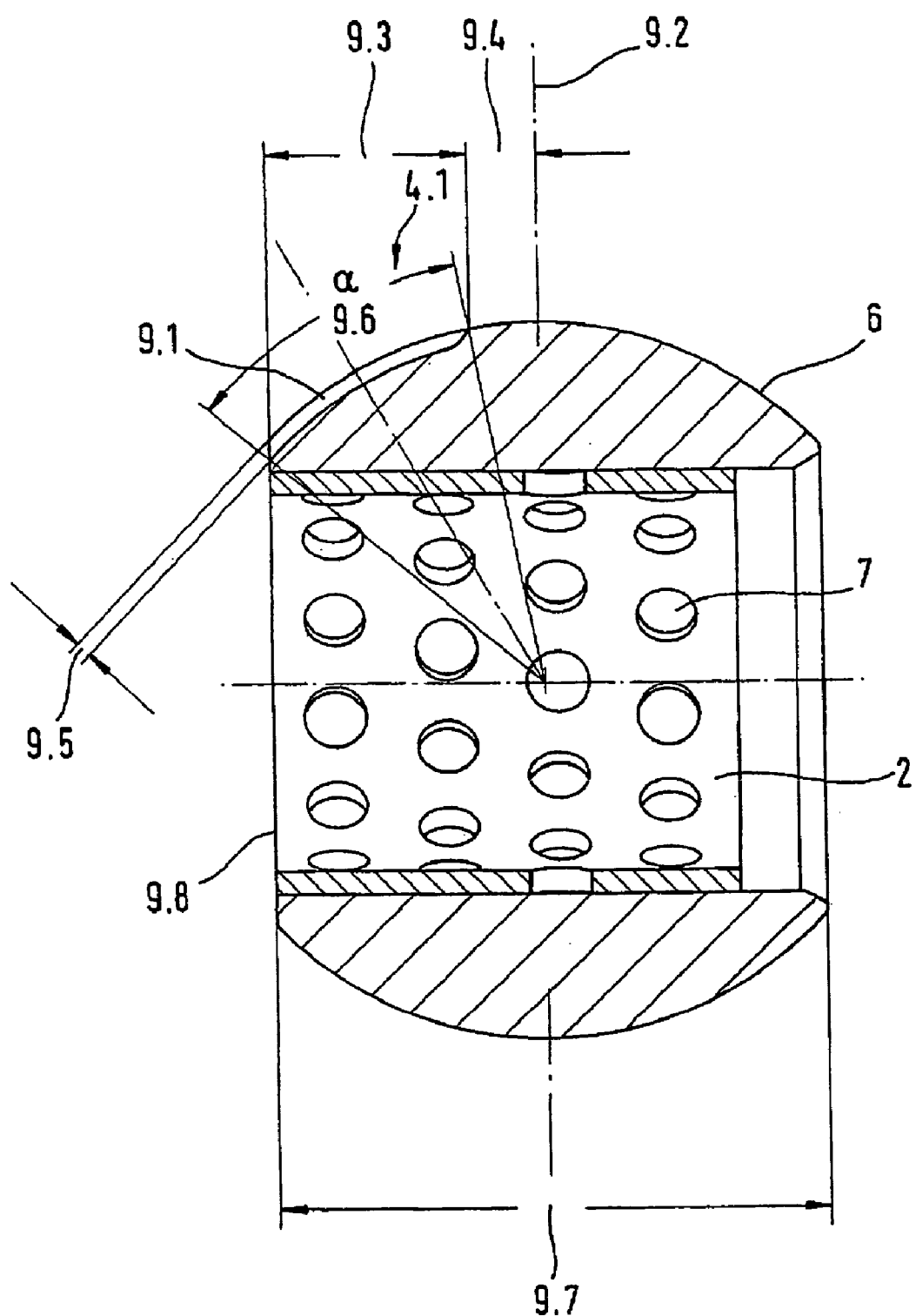
FIG. 4 shows the sliding bearing bush according to FIGS. 1b and 1c.

According to another embodiment according to FIG. 4, at least the centering ball outer surface 6 can be provided with several indentations or channels arranged at a distance, advantageously at an equal distance, from each other that likewise serve to accommodate a lubricant and thus improve the sliding properties of the ball inside the calotte 4. The lubrication grooves 9.1 are arranged in such a way that, when the sliding bearing bush 2 is in the installed state, no lubricant can flow down to the bellows 10.

The lubricating grooves 9.1 have a small depth, which can be between 1.2 and 1.8 mm. The lubricating grooves 9.1 extend from the front surface 9.8 of the joint ball or centering ball 3 with a distance 9.3 that is somewhat smaller than half of the total width of the joint ball or centering ball 3, until shortly before the mid-line 9.2, whereby the distance 9.4 makes up about ¼ of the total length of the indentation 9.1.

As can be seen in FIG. 4, the angle range α along which the lubricating groove 9.1 extends can be between 25° and 35°, advantageously 30°. In the embodiment, there are six lubricating grooves 9.1, but it is also possible to have more or less than six lubricating grooves on the surface 6 of the joint ball or centering ball 3.

Figure 1C:
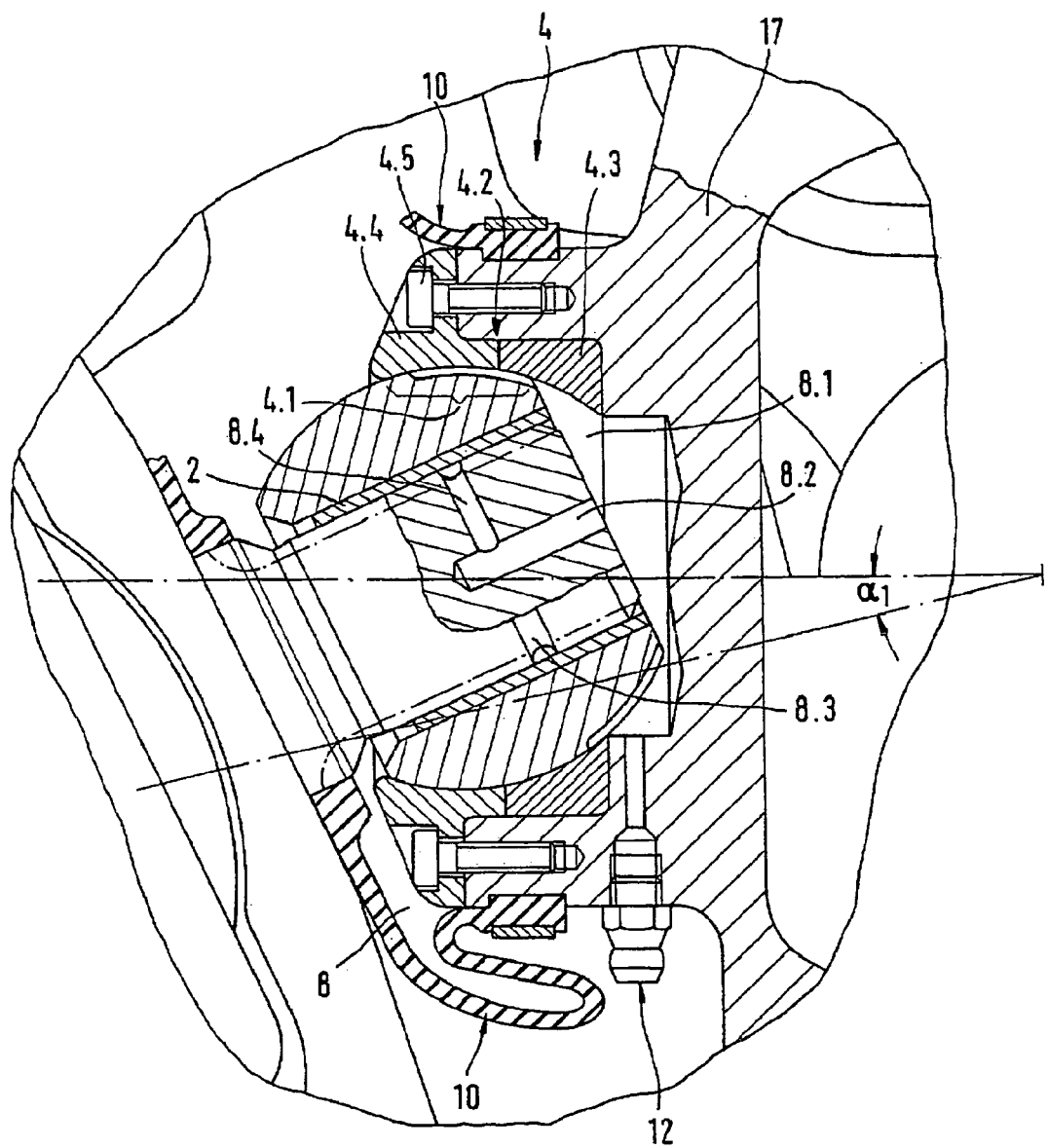

As can be seen in FIG. 1c, the two fork joints 19, 20 have assumed their maximum deflection angle $\alpha_1$ of about 15° C. In this position, the ball calotte section 4.1 covers an angle range α of about 30° and thus likewise covers the lubricating groove 9.1 completely, so that it has only one connection to the cavity 8.1. In this position as well as in any other position of the two fork joints 19, 20, the lubricating groove 9.1 has only one connection to the cavity 8.1 and can only be supplied with lubricant via this cavity 8.1, so that, as already mentioned, no lubricant can flow down to the bellows 10. This is why, as can be seen in FIG. 4, the lubricating groove 9.1 is open towards the front.

The lubricant is supplied via a lubrication opening or supply opening, here via a lubricator nipple 12. Via the lubricator nipple 12, the lubricant first reaches the cavity 8.1 via bores 8.2 to 8.4 provided in the calotte 4, so that the grease chambers 7 can be supplied with lubricant.

As can be seen in FIG. 1c, the fork joint 19 has a calotte 4 or ball calotte that is divided at 4.2 and that accommodates a first sliding bearing bush 4.3 for the joint ball 3, which is followed by another half or of a sliding bearing 4.4 that is detachably connected to the first sliding bearing 4.3 by means of screw bolts 4.5. The two sliding bearings serve to accommodate the joint ball 3.

In another embodiment not shown here, for example, the bore 14 of the ball 3 and/or also the sliding bearing bush 2 can be provided with channel-shaped or spiral-shaped lubricating grooves. Such lubricating grooves can also be provided on the centering ball outer surface 6.

The two yoke journal assemblies 17 and 18 or the appertaining fork joints 19 and 20 are likewise connected to each other by means of a connection element 15 and thus statically affixed in place.

What is claimed is:

1. A double-jointed cardan shaft for a vehicle, comprising:
   a first yoke journal assembly
   a second yoke journal assembly
   a first fork joint accommodating the first yoke journal assembly and including a ball calotte;
   a second fork joint accommodating the second yoke journal assembly;
   a connection element connecting the first and second fork joints in a drive-connection;
   a centering ball disposed in the ball calotte and including a bore, a first cavity being defined between the centering ball and the ball calotte;
   an elastic gasket sealing a second cavity between the elastic gasket and the ball calotte;
   a centering pin connected to the second fork joint and disposed in the bore; and
   a plurality of lubricant recesses for accommodating a lubricant, the plurality of lubricant recesses disposed at an interface between the centering pin and the bore, wherein the centering ball includes at least one indentation extending along an outer circumferential surface of the centering ball in a manner such that lubricant may not pass from the first cavity to the second cavity.

2. The double-jointed cardan shaft as recited in claim 1, wherein the recesses are formed in at least one of the bore and the centering pin.

3. The double-jointed cardan shaft as recited in claim 1, further comprising a sliding bearing bush disposed between the centering pin and the bore, and wherein the recesses are provided in the sliding bearing bush.

4. The double-jointed cardan shaft as recited in claim 1, wherein the centering ball includes a front surface facing the first cavity and wherein the at least one indentation extends from the front surface to a middle area of the circumferential surface.

5. The double-jointed cardan shaft as recited in claim 1, wherein the at least one indentation includes a plurality of indentations running approximately parallel to each other and disposed at about a same distance from each other.

6. The double-jointed cardan shaft as recited in claim 1, wherein a length of the at least one indentation extends over an angle range of 20° to 30° as measured from a center point of the centering ball.

7. The double-jointed cardan shaft as recited in claim 1, further comprising at least one lubricant supply opening disposed in the first fork joint for supplying the lubricant to the at least one indentation and to the plurality of lubricant recesses.

8. The double-jointed cardan shaft as recited in claim 3, wherein the sliding bearing bush is made of a softer material than the centering ball.

9. The double-jointed cardan shaft as recited in claim 3, wherein the sliding bearing bush is made of plastic, steel or bronze.

10. The double-jointed cardan shaft as recited in claim 1, wherein the centering pin is inductively hardened and tempered.

11. The double-jointed cardan shaft as recited in claim 1, wherein the circumferential surface of the centering ball is surface-coated and that a Teflon material is incorporated into the circumferential surface.

12. The double-jointed cardan shaft as recited in claim 1, wherein an outer surface of the centering pin includes a metal layer applied under a plasma at pressures below $5 \times 10^{-1}$ mbar.

13. The double-jointed cardan shaft as recited in claim 1, wherein an outer surface of the centering pin includes a first PVCD applied layer, a second sputtering applied layer and a third PVCD applied layer, wherein the first PVCD applied layer has a thickness that is less than 200 Å.

14. The double-jointed cardan shaft as recited in claim 1, wherein the centering ball is non-rotatably connected to the centering pin.

15. The double-jointed cardan shaft as recited in claim 1, wherein a cross section of the centering pin and a cross-section of the bore are eccentric.

16. The double-jointed cardan shaft as recited in claim 1, wherein a clearance fit between the ball calotte and the centering ball is equal to or smaller than a clearance fit between the bore the centering pin.

17. The double-jointed cardan shaft as recited in claim 1, wherein elastic gasket is a bellows and wherein the bellows seals the first cavity.

18. The double-jointed cardan shaft as recited in claim 1, wherein the centering pin includes a first Ni layer and the circumferential surface of the centering ball includes a second metal layer including a Teflon material, a hardness of the first Ni layer being greater than a hardness of the second metal layer.

19. The double-jointed cardan shaft as recited in claim 18, wherein the second metal layer includes Ni.

* * * * *